E. R. AUSTIN.
Chain Propeller.
No. 164,633.  Patented June 22, 1875.
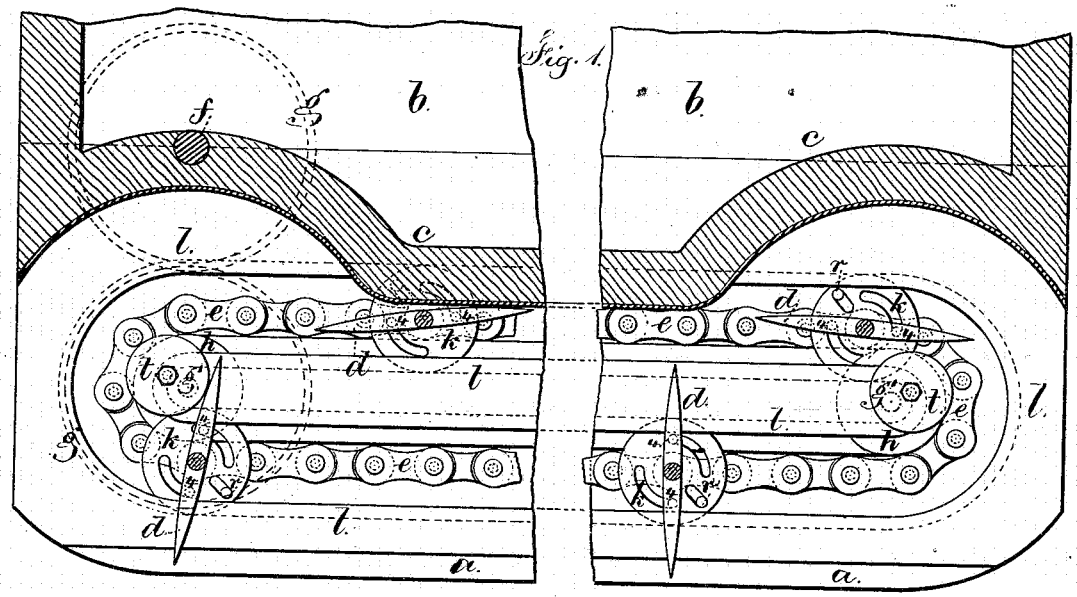
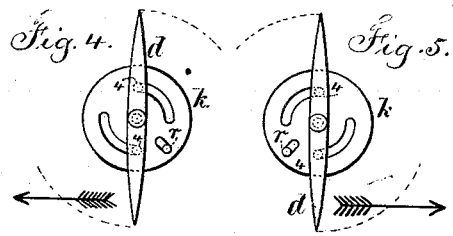
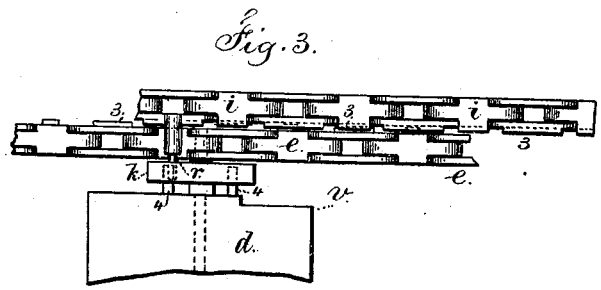
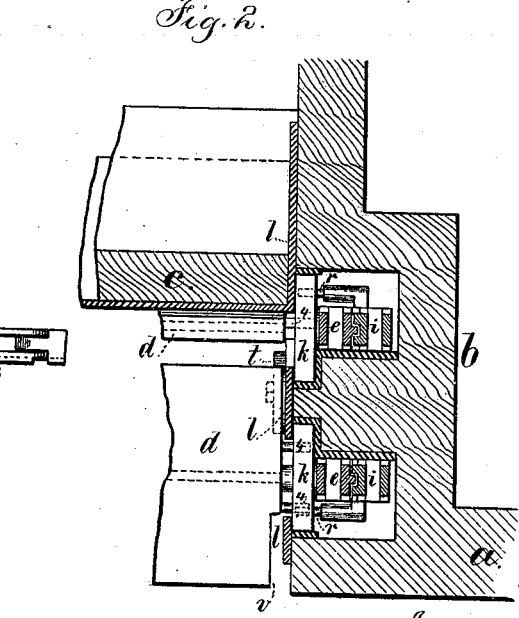
Witnesses
Chas. H. Smith
Geo. T. Pinckney
Inventor
Emmet R. Austin,
per Lemuel W. Serrell
atty
THE GRAPHIC CO. PHOTO-LITH. 39 & 41 PARK PLACE, N.Y.

UNITED STATES PATENT OFFICE.

EMMET R. AUSTIN, OF NORWALK, CONNECTICUT.

IMPROVEMENT IN CHAIN-PROPELLERS.

Specification forming part of Letters Patent No. 164,633, dated June 22, 1875; application filed November 11, 1874.

*To all whom it may concern:*

Be it known that I, EMMET R. AUSTIN, of Norwalk, in the county of Fairfield and State of Connecticut, have invented an Improvement in Propellers, of which the following is a specification:

Propellers have been made with buckets on an endless chain, the lower buckets being in the water, and the returning buckets on the upper half of the chain being above the water.

My present invention is made for the purpose of returning the buckets edgewise through the water, so that they will present but little resistance, and the parts are constructed with reference to propelling the vessel in either direction.

I employ a compound chain, to which the buckets are connected, and said chain passes around driving-pulleys. The first portion of the chain is connected to the buckets, and there are guide stop-disks intervening, and the second part of the compound chain is connected with the said disk. The said second portion of the compound chain is drawn along by the first portion of the chain, and when the direction of revolution is reversed the second portion of chain remains stationary, or nearly so, until the guide stop-disks are partially revolved into a new position, to act correctly with the buckets when going in the opposite direction.

In the drawing, Figure 1 is a section vertically, showing the two ends of the chain-propeller. Fig. 2 is a cross-section of a portion of the vessel with the propeller in position. Fig. 3 is a detached plan of part of the compound chain and bucket. Figs. 4 and 5 show the buckets and stop-disks in their relative positions when moving in opposite directions.

The bottom of the vessel is represented at $a$, and $b$ are the sides, and $c$ the top, of a trunk extending along the vessel to whatever length is desired, and $d$ are the propeller-buckets. The width of this trunk will depend upon the length of the buckets. I have shown only the chain at one side of the trunk, it being borne in mind that a similar chain is to be used in both sides of the trunk. The compound chains $e\ i$ run in grooves in the sides of the trunk, and pass around separate pulleys at the respective ends. The driving-power is communicated to the shaft $f$, and by gear-wheels $g$, shown by dotted lines in Fig. 1, the shafts $g'$ are revolved. The pulleys $h$ for the parts $e$ of the chain are fastened to their respective shafts, so as to be revolved in either direction by the power, and give motion to the chain $e$; but the pulley or pulleys of the second portion $i$ of the chains are loose on their shafts, so that the chain or chains $i$ will only be moved as they are dragged by a connection to the chain $e$. The chains $e$ and $i$ are preferably made with tongues and grooves 3 in their adjacent faces, as seen in Figs. 2 and 3, so as to partially sustain each other. The buckets $d$ are pivoted at the center of each end, and the pivots pass into the chain $e$ at the joint-pin between two links, or else a bar forming the joint-pin passes across the trunk to the opposite chain, and the bucket swings thereon, and at the ends of each bucket $d$ there are stop-pins 4 4 entering segmental slots in the stop-disk $k$, which has the said pivot or center-bar of the bucket as its center, and the stop-disks are preferably guided in position by the plates $l$ on the faces of the trunk sides. The stop-disks allow the buckets $d$ to turn about a quarter of a revolution, and, as the chain and buckets are moving in the direction represented in Fig. 4, the buckets will stand vertically and act against the water in a very efficient manner in propelling the vessel. As the bucket reaches or approaches one end of the trunk the bucket comes into contact with a fixed circular stop or standing wheel, $t$, by which it is swung into a position parallel to the links of the chain, so that said bucket will return edgewise along the under side of the top of the trunk, and, when the bucket reaches the forward end of the trunk, it is turned again into a vertical position by the advancing edge of the bucket acting against the water and moving through a greater distance than the rear edge, which hence comes uppermost, the segmental slots or stops upon the disk $k$ allowing of these movements.

It will now be evident that if the vessel were only to go in one direction the stop-disks $k$ should be fastened to the links $e$, and that the second portion $i$ of the compound chain would be unnecessary; but in order to allow of the propeller being worked in both directions, it is necessary that the stop-disks be turned from the position in Fig. 4 to that in Fig. 5, when the direction of propulsion is reversed, so that the lower edge of each bucket may be swung backwardly and upwardly when it reaches its extreme movement toward the back of the vessel, and assume a horizontal position in returning toward the front or advancing end of the vessel. These stop-disks are turned by the arms $r$, that project laterally from the secondary portion $i$ of the chain, and enter slots in the disks $k$, so that when a reverse movement of the motor takes place, the primary portions $e$ of the chains will immediately be moved, but the secondary portions $i$ will not commence to move until the portions $e$ have carried the disks $k$ far enough for the arms $r$ to turn said disks the required quarter revolution from the position of Fig. 4 to that of Fig. 5, or vice versa. The loose pulley on the shaft $g'$ may have a stop that allows of the movement of one chain, as it slips past the other, just sufficient to change the stop-disks $k$, as aforesaid.

It will be apparent that the stop-disks may have projections to determine the extent of the swinging or turning movement of the buckets, instead of the quarter-circle slots in such disks.

The circular stop $t$ or wheel that turns the buckets into a horizontal position should be at one side of the trunk, at one end of the said trunk, and at the other side of the trunk, at the other end thereof, and the ends of the buckets be notched as at $v$, in order that they may clear the stops at that end of the boat which is the advancing end.

I claim as my invention—

1. The chains $e$, stop-disks $k$, and mechanism for moving the chains $e$, in combination with propeller-buckets $d$, swinging upon horizontal axes, and the stationary disk or wheel $t$ for turning the buckets edgewise, substantially as set forth.

2. The disk $k$, made to turn upon the same axes as the buckets, and provided with stops for such buckets, in combination with the chain $e$, secondary chain $i$, and arms $r$, for turning said stop-disks $k$, substantially as set forth.

Signed by me this 29th day of October, A. D. 1874.

EMMET R. AUSTIN.

Witnesses:
GEO. T. PINCKNEY,
CHAS. H. SMITH.